United States Patent [19]

Fournier

[11] Patent Number: 4,535,151

[45] Date of Patent: Aug. 13, 1985

[54] PROCESS FOR THE WET GRANULATION OF ORGANIC PIGMENTS IN AN AQUEOUS SYSTEM WITH HYDROLYSIS OF ACETIC ANHYDRIDE, PROPIONIC ANHYDRIDE OR A MIXTURE THEREOF

[75] Inventor: Pierre L. E. Fournier, Sotteville-Lés-Rouen, France

[73] Assignee: I.C.I. Francolor S.A., Clamart, France

[21] Appl. No.: 610,935

[22] Filed: May 16, 1984

Related U.S. Application Data

[63] Continuation of Ser. No. 377,094, May 11, 1982, abandoned.

[30] Foreign Application Priority Data

Jun. 25, 1981 [FR] France ................ 81 12494

[51] Int. Cl.$^3$ .............. C09B 5/00; C09B 46/00; C09B 47/00; C09B 57/04
[52] U.S. Cl. .................. 534/739; 106/23; 106/288 Q; 106/308 Q; 106/309; 260/245.72; 534/747; 534/760; 534/874; 534/887; 546/32; 548/558
[58] Field of Search ............. 106/288 Q, 308 Q, 309; 260/208, 161, 176, 193, 202, 245.72; 534/887, 739, 747, 760, 874; 546/32; 548/558

[56] References Cited

U.S. PATENT DOCUMENTS

| | | | |
|---|---|---|---|
| 3,523,030 | 8/1970 | Malin et al. | 106/288 Q |
| 4,133,695 | 1/1979 | Wheeler et al. | 106/288 Q |
| 4,202,815 | 5/1980 | Wegmann | 8/526 X |
| 4,230,855 | 10/1980 | Capaccioni et al. | 106/288 Q X |

FOREIGN PATENT DOCUMENTS

| | | | |
|---|---|---|---|
| 1505023 | 10/1967 | France | 106/288 Q |
| 2427366 | 12/1979 | France | 106/288 Q |
| 1140836 | 1/1969 | United Kingdom | 106/288 Q |

OTHER PUBLICATIONS

Farnand et al. Canadian J. Chem. Engr., volume of Apr., 1961, pp. 94 to 97.

*Primary Examiner*—Floyd D. Higel
*Attorney, Agent, or Firm*—Beveridge, DeGrandi & Weilacher

[57] ABSTRACT

A process for the wet granulation of organic pigment is disclosed which consists in treating under vigorous agitation an aqueous suspension of pigment with acetic anhydride, propionic anhydride or a mixture thereof. Acetic anhydride is used preferentially. After hydrolysis of the anhydride, besides the granules, an aqueous solution of acid or its corresponding salt, directly saleable or re-usable in the chemical industry, is recovered whereby problems related to the recovery of organic solvents are avoided.

12 Claims, No Drawings

PROCESS FOR THE WET GRANULATION OF ORGANIC PIGMENTS IN AN AQUEOUS SYSTEM WITH HYDROLYSIS OF ACETIC ANHYDRIDE, PROPIONIC ANHYDRIDE OR A MIXTURE THEREOF

CROSS-REFERENCE TO RELATED APPLICATION

This application is a continuation of application Ser. No. 377,094, filed May 11, 1982, now abandoned.

The present invention relates to the wet granulation of organic pigments.

For many years, to make them easier to handle and less polluting, attempts have been made to provide organic pigments, usually marketed in a powder state, in a form which is as little dusty as possible, in particular in granular form obtained by mechanical or wet processes.

The wet granulation of organic pigments consists in treating under vigorous agitation an aqueous suspension of a pigment with an organic solvent. However, this method which makes use of solvents that must necessarily be recovered and recycled because of their cost and the pollution problems they would engender if discarded, does not seem to have enjoyed the growth expected of it in industry. The solvents used to the present belong to various chemical families: aliphatic or cycloaliphatic hydrocarbons, aromatic hydrocarbons, halogenated aliphatic hydrocarbons, halogenated aromatic hydrocarbons, alcohols, ketones, ethers, esters, nitrated aromatic compounds, amines, amides and organic acids. In fact, the nature of these solvents (toxicity, stability, flash point) and their aggressivity during drying to the solid matter treated, limit the interest in this granulation method.

To mitigate these disadvantages, the present invention provides a new process for the wet granulation of organic pigments, characterized in that, as the solvent incompletely miscible with water, use is made of an easily hydrolyzable compound so that after agglomeration of the solid particles of the pigment, the initial multiphase liquid medium can be easily and very rapidly converted into a homogeneous aqueous phase containing granules in suspension. This conversion can be made in various ways, simply by prolonging by agitation the contact between the phases, by the addition of water, by raising the temperature, by the addition of an alkaline agent, or by the conjugated action of several of the aforementioned means. Under these conditions are obtained on the one hand, granules of organic pigments which are isolated according to the usual known methods (for example, filtration-drying) and, on the other hand, a homogeneous aqueous phase, which is directly recoverable and saleable.

As hydrolyzable liquids, sulfochlorides, carboxychlorides or other reactive halogenated derivatives could have been considered. However, hydrolysis of these products is not always easy and, in addition, it has the disadvantage of leading to mixtures of reaction products which are difficult to re-use or sell directly without an appropriate separation treatment.

According to the present invention, as hydrolyzable compounds use is made of acetic anhydride, propionic anhydride or a mixture thereof. These compounds have the advantage of being readily hydrolyzable giving either the corresponding carboxylic acid (acid hydrolysis), or a salt of said acid (alkaline hydrolysis), or a mixture thereof.

Acetic anhydride is used preferentially; not only are the hydrolysis kinetics of this anhydride particularly favorable in a turbulent medium, but it is an industrial product of moderate price, which like its hydrolysis products: acetic acid, sodium acetate, is already consumed in large quantities in various sectors of the chemical industry.

According to the invention, a single anhydride or a mixture of acetic anhydride and propionic anhydride can be used. Utilization of a mixture of anhydrides can be particularly interesting in particular because of the differences in solvent power of the two anhydrides with respect to certain pigment coating substances. Thus, for example, utilization of a mixture of acetic anhydride and propionic anhydride allows the incorporation of additives which would be difficult if only acetic anhydride alone was used because of its lesser solvent power; as the dissociation constants of acetic and propionic acids are very similar, the mixture of acids or salts, obtained by hydrolysis, can still be recovered and sold or re-used as is in certain azo dye manufacturing processes.

Subject to particular sensitivity to the anhydride used (acylating or solvent effect), the granulation process according to the invention can be applied to the most diverse organic pigments, notably to azo pigments, azo methinic, anthraquinone or perinone pigments and the phthalocyanine or imino-isoindolinone pigments. The process according to the invention is particularly suitable for the granulation of the usual azo pigments such as acrylamide yellows, diarylide yellows, disazoic oranges called "benzidine orange" and the pigments (mostly of red, ruby or bordeaux red color) constituted by the lake or the salt of an alkaline earth metal of a monoazo dye resulting from the coupling of the diazo compound of an aminotoluenesulfonic acid, possibly substituted, with beta-naphthol or 3-hydroxy-2-naphthoic acid. The granulation method according to the invention can obviously be applied not only to pure pigments, but also to mixtures of pigments or pigment compositions containing additives which can be introduced during synthesis or by means of any particular incorporation method.

To operate the process according to the invention, it is preferred to start with a press cake, the pigment concentration of which can vary according to the nature of the pigment and the synthesis and finishing conditions. The starting material can also be a pigment in powder form which is then reconverted into paste form. It is also possible to operate the process according to the invention by starting from a freshly prepared pigment formation. However, in this case, the by-products of synthesis (salts, excess of reactants, acids and alkaline agents) are present in the filtrate, the use of which is therefore restricted; nevertheless, this way of operating constitutes a possibility not to be excluded if quality of the recuperated filtrate is not demanded or if it is subjected to a further purification. The optional addition, to the aqueous suspension of pigment, of an alkali metal salt of the carboxylic acid corresponding to the anhydride used can, if desired, diminish solubility of the anhydride in water and avoid by a buffering effect a too large lowering of the pH of the aqueous phase, that can in certain cases be detrimental to the quality of the pigment obtained.

The anhydride or mixture of anhydrides is preferably added rapidly to the aqueous suspension of the pigment and bringing into contact is effected very simply by turbulent mixing with the aid of an efficient agitation system such as for example a deflocculation turbine. Such efficient agitation enables granules of sufficiently homogeneous size to be obtained.

The minimum quantity of anhydride to be used to form the initial multiphase system depends first on the nature of the anhydride, then on the quantity of water in the antagonistic phase, as well as on the concentration of acylate present in the aqueous phase. In the case of acetic anhydride, this minimum quantity is about 20 to 25% by weight with respect to the quantity of water used.

On the other hand, a large excess of anhydride can be used with respect to the water without risking the formation of irreductible compacted masses. The process according to the invention does not require any particular care to be taken at this point, because of the rapid disappearance of a large part of the solvent phase by hydrolysis, contrary to the case in known multiphase systems wherein the system remains as is during the granulation operation and wherein the respective proportions of water and solvent must be stipulated with precision. This advantage of the process according to the invention is particularly marked with acetic anhydride for which the conditions leading to very rapid hydrolysis can easily be obtained.

However, too high an excess of anhydride with respect to the quantity of water maintains the simultaneous presence of the two liquid phases for a longer time, and the granules form less rapidly, after passing through a "flushed" phase. In addition, utilization of a very large proportion of anhydride tends to be contrary to the economics of this process. For that reason, without corresponding to an effective limit to the efficiency of the process a proportion of 100% of anhydride with respect to water is a reasonable practical upper limit.

The lower limit by weight of the anhydride/pigment ratio is fixed by the acceptable concentration of pigment in the aqueous phase and by the necessity of sufficiently wetting the pigment to cause granulation to take place. In general, this lower limit can be reduced to below 1 only with difficulty. In practice, it is preferred to maintain the anhydride/pigment ratio to a value between 1.2:1 and 7:1.

In view of the ease with which the pigment is wetted by the anhydride and turbulent mixing, granulation takes place rapidly. It then remains only to complete hydrolysis of the anhydride by using one of the means disclosed above (agitation, dilution, heating and/or alkalinization). The granules are separated from the homogeneous aqueous phase in a known manner, for example, by filtration. This separation is particularly easy and can be achieved by means of a known simple system, for example a sieve with standardized brass mesh.

According to a preferred method of the invention, the granules are isolated just after their formation and taken up in water to complete hydrolysis by one of the aforementioned means. In view of the hydrolysis rate, this operation, preferably effected under moderate agitation, is generally of short duration, this is followed by filtration and light washing of the moist granules to remove as much as possible of the acid or salt formed by hydrolysis.

The dry extract of the moist granules is usually more than 40%, that is, clearly higher than that of the usual pigment suspensions. This is particularly appreciable in the field of azoic pigments, where it is difficult, using conventional methods, to obtain a dry extract of more than 25%. In addition, under the process conditions according to the invention, this high dry content extract is obtained without any compression of the moist granules. The granules, which no longer contain any solvent, can be dried, without any costly specific investment, in any of the conventional drying equipment, for example, in a hot air oven (60°–70° C.).

In addition, by reuniting the various filtrates and washing waters, and possibly after neutralization and, if necessary, after decoloration with activated carbon, an aqueous solution of acid or salt is obtained which can be used as such in various industries, in particular in the manufacture of dyes. If necessary, content of the solution can be adjusted to a desired value for sales purposes.

The size of the pigment particles used in the granulation process according to the invention is that which is usually found in a press cake, that is, closely dependent on the synthesis and finishing conditions of the pigment under consideration. Although this does not constitute a necessary condition for the efficient application of the process according to the invention, the press cake, optionally, can be ground or kneaded in the presence of solvents and/or other additives to improve the state of division of the pigment particles.

In the process according to the invention, the utilization of an auxiliary granulation product is not necessary to obtain granules. However, in view of the not negligible solvent power of acetic anhydride and propionic anhydride with regard to generally known substances for improving pigment application performance, the anhydride can be used as an excellent vehicle for incorporation of these substances around the pigments to be granulated. Of even more advantage, the anhydride can constitute a preferred chemical conversion medium for certain additives, such as organic derivatives containing one or several easily acylable functions such as, for example, amino functions. This treatment before use constitutes another marked advantage of the process according to the invention.

Although the utilization of additives is not essential, this can sometimes prove to be beneficial to the granulation process and cohesion of the granules obtained. The additives that can be used in the process according to the invention are preferably chosen in accordance with their solubility or dispersibility in the anhydride; such dispersibility can be obtained either directly or with the aid of another liquid such as a mineral oil or any other liquid normally used in the production of pigments. Among the most interesting additives can be mentioned the aromatic, cycloaliphatic or long chain aliphatic carboxylic acids, abietic acids derived from colophane, as well as the corresponding salts, anhydrides, esters and amides, polymer resins such as cellulose derivatives, polyvinyl alcohol, polyamides, polyesters, hydrocarbon resins, aliphatic, cycloaliphatic, aromatic and abietic alcohols and amines.

To retain the practical interest of the process according to the invention, that is, obtaining, besides granules, a directly re-usable or saleable solution of acid or salt, it is not desirable to use additives that are soluble or dispersible in water under the preparation conditions. However, the granulation operation as such can be carried out easily in the presence of water-soluble or water-dispersible substances such as, for example, wetting agents such as alkaline soaps of anionic derivatives, soaps of aminocarboxylic acids, sulfates, sulfonates or esters of fatty acids or hydroxyalkane sulfonic acids, surfactants of the phosphate type, fatty amine salts, derivatives of fatty acids and polyamines or amino alcohols, quaternized amines, esters of fatty acids and polyalcohols, alkylolamides of fatty acids, adducts of alkylene oxides, ligno-sulfonates, salts of dinaphthyl methanedisulfonic acid, esters of fatty acids and alkylolamines, derivatives of fatty acids with an imidazolyl substituent, quaternary derivatives of pyridine or imidazole, derivatives of betaine, mercaptans, amides, amines or ethoxylated polypropylene glycols.

The granules obtained in accordance with the process according to the invention are in the form of fairly regular agglomerates, mostly roughly rounded off, and of a size between 0.1 and 4 mm, usually between 0.3 and 2 mm.

The quantity of anhydride used for the granulation process can vary within a quite wide range, nevertheless without markedly affecting the final size of the granules. In fact, their dimensions and uniformity depend especially on the experimental conditions (turbulence in the reaction medium, prolongation of the mixing time after formation of the granules). From the application point of view, the behavior of these granules is comparable to that of the corresponding pigments in powder form in the usual fields of application of the pigments under consideration.

In addition to the advantages that have already been pointed out, the granulation process according to the invention does not require any complicated and costly installation for recovering solvents and does not raise any particular problems as regards safety, once the granulation has been completed, for it excludes all handling of toxic or flammable solvents and any drying operation in the presence of solvents.

The following examples in which the percentages are understood to be by weight, illustrate the invention without limiting it.

EXAMPLE 1

Into a 2 liter cylindrical reactor were introduced 700 g of a moist filter cake containing 17% of a yellow diazo pigment of the formula:

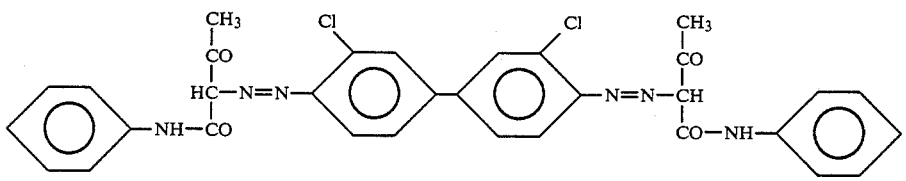

A paste was then made over a period of 5 minutes with 120 ml of water with the aid of a toothed disc agitator (dissolver type) giving a high shear effects. When the suspension was homogeneous, the agitation speed was adjusted to 1,000 rpm and 320 g of acetic anhydride were introduced over 2 minutes, while maintaining the temperature at 25° C. The granules formed rapidly. The mixing was continued for another 10 minutes under moderate agitation (300 rpm), the temperature not exceeding 30° C. This was followed by filtering on a 160NF brass sieve (mesh: 0.109 mm) and washing with water to remove the acetic acid. The high pigment content moist granules were collected (dry extract more than 40%). The granules were dried in a hot air oven at 60°–70° C. The granules were finally obtained, the size of most of which being 0.5 to 1 mm.

Incorporated in an offset ink, they have coloristic properties similar to those of the corresponding pigment in powder form.

On the other hand, reuniting the filtrate and the washing waters gave a clear, colorless solution which contained 23.5% acetic acid and can be used as is in the manufacture of certain pigments and azoic dyes.

EXAMPLE 2

In the same arrangement as in Example 1, a paste was made with 100 ml of water, 150 g crystallized sodium acetate ($NaCH_3CO_2$, $3H_2O$) and 600 g of the same mist filter cake as in Example 1. When the suspension was homogeneous, the agitation speed was adjusted to 1,000 rpm and 300 g acetic anhydride were added over 3–4 minutes from a flask, while maintaining the temperature at about 25° C. The incorporation of acetic anhydride fluidified the medium and granules formed very rapidly which were easily separated by filtration on a Buchner funnel.

These granules were again converted into paste with 300 ml of water and the suspension was neutralized to pH of 9 by addition of a 40% aqueous solution of sodium hydroxide; since the neutralization process is exothermic, the temperature rose to 35°–40° C. The granules were isolated by filtration and washed lightly on the filter to remove the sodium acetate. Reuniting the filtrate thereby obtained with the first filtrate, neutralized in the same way, yielded a 20% aqueous solution of sodium acetate which can be concentrated by evaporation or by the addition of crystallized sodium acetate, or used as is as a buffering agent element in the manufacture of certain azoic pigments.

The moist granules which, without any squeezing, had a dry extract slightly above 40%, were dried at 60° C. in a hot air oven. Finally, pigment granules were obtained with characteristics similar to those of granulates obtained in Example 1. Incorporated in a conventional binder for offset inks, they have good coloring properties.

EXAMPLE 3

8 g of amine derived from colophane (Rosin Amine D marketed by the Hercules Company) were agitated in 280 g acetic anhydride for 4 hours. The acetylation reaction was slightly exothermic.

In addition, with the aid of an efficient agitation device (for example, toothed disc deflocculation turbine), 600 g of moist filter cake containing 13.2% of diazo yellow pigment of the formula:

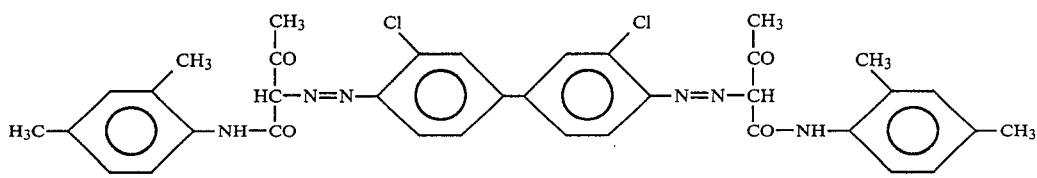

were made into a paste with 150 ml of water. The agitation speed was adjusted to 1,000 rpm and the amine solution obtained above was introduced over 5 minutes. The temperature remained at 25°–30° C. and the spherical pigment granules formed very quickly and these were easily separated by filtration.

These granules were made into a paste again under slow agitation (300 rpm) for 15 minutes in 400 ml of water at 45° C.; this was followed by another filtration and a slight washing.

When the filtrates were reunited, the solution obtained, which was absolutely clear, contained 23% of acetic acid, which can be used as is in the manufacture of azoic pigments.

The moist granules which had a high dry extract content (about 45%) were dried at 60°–70° C. The granules obtained were of fairly uniform dimension, the size of most of them being about 0.5 mm. Their performance is excellent in printing inks.

EXAMPLE 4

The same procedure as in the first two paragraphs of Example 3 was followed, except that the Rosin Amine D was replaced by a long chain aliphatic amine (Noram OD marketed by the CECA Company) and the granules were not isolated immediately they were formed, but agitation was continued for 12 minutes under moderate speed (300 rmp).

At the end of this time, the reaction mixture of which the temperature was maintained below 30° C. consisted of a homogeneous liquid phase containing the pigment granules in suspension which were filtered and washed with water to remove the acetic acid. Moist granules with a high dry extract content (more than 45%) were obtained. After drying at 60°–70° C., granules were collected of a size mostly of 0.5 to 1 mm. They can be used advantageously for coloring inks.

In addition a clear, practically colorless liquid containing 20% of acetic acid was collected, which can be used as such in the manufacture of dyestuffs.

EXAMPLE 5

In a reactor fitted with an efficient stirrer, a paste was made in 600 ml of water with 400 g of a moist filter cake containing 13.3% of ruby pigment, obtained by coupling, in the presence of colophane, of the diazo compound of 2-amino-5-methylbenzene-sulfonic acid with 3-hydroxy-2-naphthoic acid, then conversion into calcium lake pigment represented by the formula:

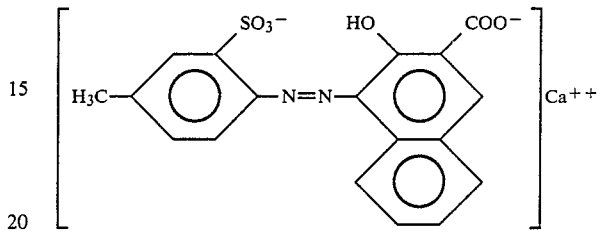

After addition of 100 g crystallized sodium acetate, the stirring speed was adjusted to 1,000 rpm and 350 g of acetic anhydride were introduced over 2 minutes, while maintaining the temperature below 20° C. The granules formed rapidly. They were filtered, and the moist granulates were made into paste again in 300 ml of ice water. This was followed by introducing slowly so that the temperature did not exceed 25° C. (over about 20 minutes) and under moderate stirring (300 rpm), a 40% aqueous solution of sodium hydroxide in a quantity sufficient to bring pH of the suspension to 9.5. The granules were isolated by filtration and washed with water to remove the sodium acetate.

The moist granules which had a relatively high dry extract content (35%) were then dried at 60°–70° C. in a hot air oven. Finally, granules were obtained, most of which had a size of about 0.5 mm, having had good coloristic properties when they were incorporated in a conventional varnish for offset inks, for example, an alkyd resin-based varnish.

When the filtrates and washing waters were reunited, neutralized to a pH of 9.5 with a 40% aqueous solution of sodium hydroxide, and then decolorized by addition of 5 g of activated carbon, a 19% aqueous solution of sodium acetate was obtained which can be used as such in the manufacture of dyestuffs.

EXAMPLE 6

The procedure followed was as in Example 5, except that 4.2 g of N-oleyl propylenediamine dioleate (Inipol 002 from the CECA Company) were dissolved in 350 g of acetic anhydride.

Pigment granules were obtained with dimensional characteristics differing little from those of the granules obtained under Example 5, and they performed satisfactorily in resinate and toluene based varnishes, intended especially for the manufacture of liquid inks for heliogravure.

EXAMPLE 7

By making a paste with a press cake and water under efficient stirring, 1,000 g of a fluid paste was prepared containing 5.3% of the ruby pigment defined in Example 5. When the paste was quite homogeneous, 100 g of crystallized sodium acetate were added to it, then, over 2 minutes, with a stirrer speed of 1,000 rpm and at a temperature below 15° C., 350 g of acetic anhydride were introduced in which 4.2 g of laurylamine (Noram 12D from the CECA Company) had previously been acetylated for 4 hours. The granules formed rapidly after the addition of anhydride: the time required for their formation, under the experimental conditions, was found to be 4 to 5 minutes. This was followed by filtration and the moist granules were taken up in 300 ml of ice water. A 40% aqueous solution of sodium hydroxide was then added over 30 minutes until the pH was 9.5, while maintaining the temperature below 25° C. This again was followed by filtration and washing with water to remove the acetate. The moist granules had a dry extract of 40%. After drying at 70° C. they were in the form of rounded agglomerates, most of a size between 0.5 to 1 mm. They can easily be used for coloring inks.

In addition, by reuniting various filtrates and washing waters and adjusting their pH to 9.5 with a sodium hydroxide solution, an approximately 20% aqueous solution of sodium acetate was obtained.

EXAMPLE 8

With the aid of a deflocculation turbine, a paste was made with 700 g of a moist filter cake containing 27% of the ruby pigment represented by the formula:

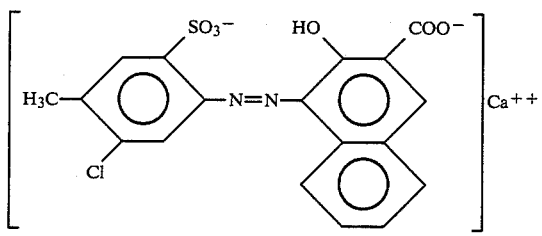

and a solution of 12 g of dioctyl phthalate in 400 g of acetic anhydride. The outside of the reactor was cooled and the stirring speed gradually increased until it was 80–900 rpm. After 15 to 20 minutes of turbulent stirring, the temperature had risen to 25°–27° C. and the formation of granules were observed, these being separated by filtering. The granules were then reconverted into paste over 20 minutes in 400 ml of water at 35° C. and again filtered and washed with water to remove the acetic acid. After drying the moist granules (about 42% dry extract) at 60°–75° C. in a hot air oven, a pigment composition was obtained in the form of granules of between 0.5 and 2 mm. They are very suited for coloring plastic materials, notably polyvinylchloride.

After decolorization with 5 g of activated carbon, all the filtrates and washing waters together gave a 23% aqueous solution of acetic acid which can be used in the manufacture of dyestuffs.

EXAMPLE 9

The procedure of Example 8 was followed except that the dioctyl phthalate was replaced by 9.5 g sorbitane mono-oleate (Span 80 marketed by the Atlas Company). Pigment granules were obtained which on the whole were slightly larger than those obtained in Example 8; the size of most of them was between 1 and 1.5 mm.

EXAMPLE 10

In a reactor fitted with a toothed disc stirrer, 184 g of a filter press cake containing 38% of a blue copper beta-phthalocyanine pigment were desintegrated during 15 minutes in 516 ml of water. The stirrer was adjusted to 800–1,000 rpm followed by the introduction of 400 g acetic anhydride over 2 to 3 minutes. The medium fluidified very quickly. Stirring was continued for another 20 minutes, and the granules formed filtered and made into a paste again under moderate stirring (300 rpm) for 20 minutes in 400 ml of water at 50° C. The granules were filtered again, washed on the filter with water to remove the acetic acid and dried at 70° C. in a hot air oven. In this way, a blue pigment in granular state was obtained in the form of rounded agglomerates of good uniformity and mostly of a size of 0.5 to 1 mm. They have good properties for application in inks.

By reuniting the filtrates and washing waters, a 22% aqueous solution of acetic acid was moreover obtained with a light blue coloration which can be removed by treatment with activated carbon.

EXAMPLE 11

In a 2 liter reactor fitted with a stirring device, paste was made with 368 g of moist filter press cake containing 38% of copper beta-phthalocyanine in 516 ml of water. After 15 minutes of homogeneization, the stirring speed was adjusted to 1,000 rpm, then a solution of 7 g of a mixture of C13 and C15 linear fatty alcohols (Acropol 35 marketed by the assignee of the applicant) in 300 g of acetic anhydride was added over 2 minutes. Granulation took place very rapidly at the ambient temperature.

As soon as the granules formed the stirrer speed was adjusted to 300 rpm and the mixing continued for 20 minutes. The temperature of the reaction medium rose to 30°–35° C. This was followed by filtration, washing the granules with water to remove the acetic acid and drying the moist granules (dry extract over 45%) in an oven at 60°–70° C. After drying, blue granules were obtained, the size of most of which was about 0.5 mm. The application characteristics were as good as those of the granules in the Example 10.

In addition, a 22% aqueous solution of acetic acid was obtained.

EXAMPLE 12

With 400 ml of water and 250 ml of a 2% aqueous solution of sodium oleate, a paste was made over a period of 20 minutes under vigorous stirring with 105 g of orange pigment represented by the formula:

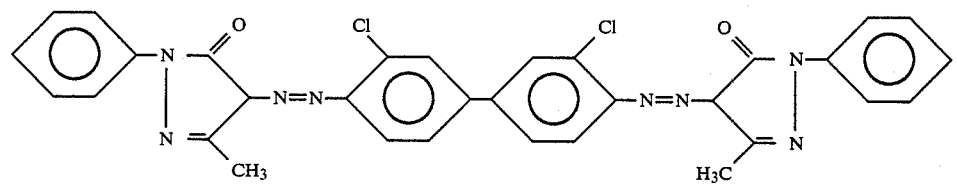

and then 300 g of acetic anhydride were introduced over 1 to 2 minutes under vigorous stirring. The temperature remained at 25°–27° C. After formation of the granules, stirring was continued for another 30 minutes under moderate stirring, followed by filtration, preparation again of a paste of the moist granules in 500 ml of water at 40° C. for 15 to 20 minutes, and filtering again. After washing on a filter with water, the moist granules with a particularly high dry extract (about 55%) were dried. A pigment composition was obtained in the form of granules, the size of most of which was between 0.5 to 1 mm. These can be used in particular for coloring plastic materials.

By reuniting the filtrates and washing waters, after decolorization with 2 g of activated carbon, a 23% aqueous solution of acetic acid was obtained.

EXAMPLE 13

With 600 ml of water and 10 ml ethanol, a paste was made with 70 g of the yellow pigment represented by the formula:

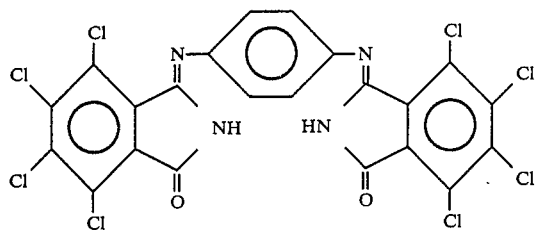

When the suspension was completely homogeneous, 300 g of acetic anhydride were added over 3 minutes under vigorous stirring. After 12 minutes of turbulent stirring, filtration was effected, the moist granules taken up in 500 ml of water at 60° C. for 15 minutes, followed again by filtration and washing with water. The moist granules had a dry extract of the order of 52%. After drying at 60°–70° C., yellow granules of good uniformity were obtained, the size of most of which was 0.5 mm. Their application performance is considered to be as good as that of the starting pigment in powder form.

By reuniting the filtrates and washing waters, a 20% solution of acetic acid was obtained.

EXAMPLE 14

600 g of a moist filter cake containing 15% of the disazo yellow pigment described in Example 1, were homogenized with 100 ml of water.

On the other hand, 3 g of a pentaerythritol ester of maleic modified colophane (Pentalyn G marketed by the Hercules Company) were dissolved in 40 g of propionic anhydride, then 200 g of acetic anhydride were added to the solution. This was followed by rapidly introducing this mixture of anhydrides into the preceding pigment formation, under high turbulence conditions (1,000 rpm). After stirring for 5 minutes, the stirrer speed was reduced to 300 rpm and a 40% solution of sodium hydroxide was introduced over 1 hour and a half until the pH was 9.5, while maintaining the temperature of the mixture at 30°–35° C. by externally cooling the reactor. Stirring was continued for another 30 minutes at a pH of 9.5 before isolating the granules. After drying at 70° C. a yellow pigment composition was obtained in the form of rounded granules, the size of which was mostly between 0.5 to 1 mm. They are very suitable for coloring inks. In addition, an aqueous solution containing about 18% of sodium acetate and 3.4% of sodium propionate was recovered.

EXAMPLE 15

A paste was made over a period of 20 minutes with 90 g of perinone orange pigment represented by the formula:

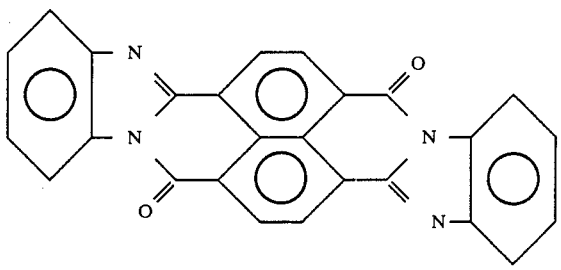

with 400 ml of water and 100 ml of a 3% aqueous solution of the sodium salt of colophane. This was followed by introducing over 5 minutes under vigorous stirring a solution of 8 g of trimethylolethane tribenzoate (Benzoflex S-432 marketed by Velsicol Chemical Corp.) in 450 g of acetic anhydride. After a further 15 minutes of stirring, the granules formed were isolated by filtration, made into a paste again in water at 40° C. filtered again and washed. After drying the moist granules which had a high dry extract content (about 45%), an orange pigment compositon was obtained in the form of fairly uniform granules the size of most of which was between 1 and 1.5 mm. They are suitable for coloring plastic materials.

In addition, a 24% solution of acetic acid was obtained.

EXAMPLE 16

A paste was made of 300 g of a press cake containing 38% of a copper beta-phthalocyanine blue pigment and 500 g of water. This was followed by introducing over 20 minutes 145 g of propionic anhyride under vigorous turbulence, obtained by means of a toothed disc stirrer turning at 1,000 rpm. The temperature rose to 28° C. and the granules formed as soon as the anhydride had been introduced. This was followed by neutralization to a pH of 9.5 by introducing over 30 minutes and under moderate stirring (300–350 rpm) about 220 ml of a 40% aqueous solution of sodium hydroxide; the temperature rose to 40° C.

Stirring was continued another 15 minutes, and the granules were isolated in the usual way. The moist granules had a very high dry extract (about 59%). After drying, they were in the form of small agglomerates of fairly round form and of a size mostly between 0.3 L and 0.5 mm. Their coloristic performance was good in the usual application media of this type of pigment.

In addition, a 15% aqueous solution of sodium propionate was recovered which can be used in the dyestuffs industry.

EXAMPLE 17

A paste was made over a period of 15 minutes under stirring with 100 g of the monoazo yellow pigment of the formula:

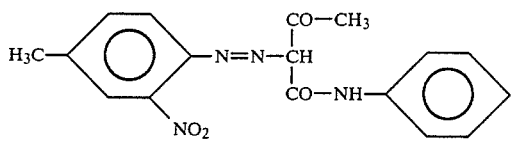

in 600 ml of water and 5 g of a condensate of 8 moles of ethylene oxide and 8 moles of propylene oxide (Emkalyx-Pluronics F88 marketed by the assignee of the applicant). This was followed rapidly (2-3 mn) by the introduction under vigorous stirring of 450 g of acetic anhydride. When the granules had formed, moderate stirring was continued for another 30 to 35 minutes while maintaining the temperature below 35° C. The granules were then filtered and washed with water. The moist granules, with a high dry extract (about 50%) were dried in an oven. The size of most of the granules obtained was between 0.5 and 1 mm. They can be used for coloring water or polar solvent based inks.

By reuniting all the filtrates and washing waters, a 22% aqueous solution of acetic acid was obtained which can be used in the manufacture of dyestuffs, at least for certain reactions where the presence of the non-ionic surface-active agent which this solution contains is not a hindrance.

EXAMPLE 18

Into a cylindrical reactor fitted with an efficient stirring device, were introduced 700 g of a press cake containing 38% of a blue copper beta-phthalocyanine pigment, 5 g of the di-sodium salt of dinaphthylmethane disulfonic acid (Dispergine CB marketed by the assignee of the applicant) and 400 g of acetic anhydride. After 15 to 20 minutes turbulent stirring (1,000 rpm), the granules formed were isolated. They were again taken up in 600 ml of water at 50° C. and then filtered again, washed with water on the filter and dried at 60°-70° C. The granules obtained, the size of most of which was about 1 mm, had an application performance which differed little from that of the corresponding pigment in powder form.

After clear filtration in the presence of activated carbon, a 24% aqueous solution of acetic acid was also obtained which can be used directly in the manufacture of certain azo dyestuffs for which the presence of an anionic dispersing agent is not a hindrance.

What is claimed is:

1. In a process for the wet granulation of pigment particles to form granules by stirring said pigment in a multi-phase system comprising water and an organic solvent which is incompletely miscible with water, the improvement wherein the organic solvent is an easily hydrolyzable compound selected from the group consisting of acetic anhydride, propionic anhydride and mixtures thereof, whereby, after agglomeration of the solid particles of the pigment, the initial multiphase liquid medium is converted into a homogeneous aqueous phase containing the granules suspended therein.

2. The process according to claim 1 wherein the multiphase system initially formed by the water and the organic solvent contains also a solid or liquid coating additive, granulation additive or mixture thereof.

3. The process according to claim 2 wherein the additive is introduced in the form of a solution, a dispersion or an emulsion in the organic solvent.

4. The process according to claim 3 wherein the additive is an acylated derivative, previously formed and dissolved in the organic solvent used for granulation.

5. The process according to claim 1 wherein an alkali metal salt of the carboxylic acid corresponding to the anhydride used is added to the system.

6. The process according to claim 1 wherein said granulation is carried out in the presence of a wetting agent.

7. The process according to claim 1 wherein said pigment is initially present as a press cake.

8. The process according to claim 1 wherein the ratio by weight of anhydride/pigment is between 1.2:1 and 7:1.

9. The process according to claim 1 wherein the organic solvent is acetic anhydride.

10. The process according to claim 1 wherein the solvent is a mixture of acetic anhydride and propionic anhydride.

11. The process according to claim 1 wherein the granules obtained are isolated just after their formation, then mixed with water to complete the hydrolysis thereof and again isolated.

12. A process for the wet granulation of an organic pigment which comprises treating an aqueous suspension of the pigment with an organic solvent which is incompletely miscible with water selected from the group consisting of acetic anhydride, propionic anhydride and mixtures thereof, vigorously agitating the resulting mixture to effect contact between the pigment and the organic liquid whereby, after agglomeration of solid particles of the pigment, initial multi-phase liquid is rapidly converted into a homogeneous aqueous phase containing granules of pigment suspended therein.

* * * * *